United States Patent
Cooper et al.

(10) Patent No.: US 9,493,143 B2
(45) Date of Patent: Nov. 15, 2016

(54) SYSTEM AND METHOD FOR CONTROLLING VELOCITY OF A VEHICLE

(75) Inventors: Jared Klineman Cooper, Melbourne, FL (US);
(Continued)

(73) Assignee: General Electric Company, Schenectady, NY (US)

( * ) Notice: Subject to any disclaimer, the term of this patent is extended or adjusted under 35 U.S.C. 154(b) by 876 days.

(21) Appl. No.: 13/486,946

(22) Filed: Jun. 1, 2012

(65) Prior Publication Data
US 2013/0325258 A1 Dec. 5, 2013

(51) Int. Cl.
*B60T 7/18* (2006.01)
*B61L 27/00* (2006.01)
(Continued)

(52) U.S. Cl.
CPC .............. *B60T 7/18* (2013.01); *B60T 13/665* (2013.01); *B60T 17/228* (2013.01); *B61L 25/02* (2013.01);
(Continued)

(58) Field of Classification Search
CPC .............. B60T 7/18; B60T 13/665; B60T 17/228; B61L 27/0011; B61L 25/021; B61L 25/02
See application file for complete search history.

(56) References Cited

U.S. PATENT DOCUMENTS

| 6,144,901 A | 11/2000 | Nickles et al. |
| 6,332,106 B1 | 12/2001 | Hawthorne et al. |

(Continued)

FOREIGN PATENT DOCUMENTS

| CN | 101767596 A | 7/2010 |
| DE | 102007015578 A1 | 9/2008 |

(Continued)

OTHER PUBLICATIONS

Kitae Kim, "Optimal Train Control on Various Track Alignments Considering Speed and Schedule Adherence Constraints" NJIT Ph.D Thesis, Jan. 2010.
(Continued)

*Primary Examiner* — Rodney Butler
*Assistant Examiner* — Frederick Brushaber
(74) *Attorney, Agent, or Firm* — GE Global Patent Operation

(57) ABSTRACT

A control system includes an onboard controller, a location determination system, and a speed sensor. The controller identifies a designated area along a route that includes a downhill section, an airflow restricted area, a banked section, a section to be cleaned, an adverse environmental area, an adverse vehicular condition area, and/or a section where travel is restricted. The designated area is associated with an operating rule that requires the vehicle to travel at least as fast as a lower speed limit. The location determination system monitors actual locations of the vehicle as the vehicle travels along the route. The speed sensor obtains speed data representative of an actual velocity of the vehicle. The controller restricts control of the vehicle such that the actual velocity of the vehicle is at least as fast as the lower speed limit of the designated area when the vehicle is in the designated area.

30 Claims, 5 Drawing Sheets

(75) Inventors: David Eldredge, Melbourne, FL (US);
David Peltz, Melbourne, FL (US);
John Brand, Melbourne, FL (US);
Frank Wawrzyniak, Melbourne, FL (US); Robert Bremmer, Calgary (CA);
Michael Barrett, Kennesaw, GA (US);
Wolfgang Daum, Erie, PA (US)

(51) Int. Cl.
*B61L 25/02* (2006.01)
*B60T 13/66* (2006.01)
*B60T 17/22* (2006.01)

(52) U.S. Cl.
CPC .......... *B61L 25/021* (2013.01); *B61L 27/0011* (2013.01)

(56) References Cited

U.S. PATENT DOCUMENTS

| | | | |
|---|---|---|---|
| 7,447,571 B2 | 11/2008 | Nickles et al. | |
| 7,792,089 B2 * | 9/2010 | Aiken et al. | 370/347 |
| 7,925,426 B2 | 4/2011 | Koebler et al. | |
| 7,974,774 B2 | 7/2011 | Kumar | |
| 8,112,191 B2 | 2/2012 | Kumar et al. | |
| 8,190,312 B2 | 5/2012 | Nandedkar et al. | |
| 2010/0023190 A1 * | 1/2010 | Kumar et al. | 701/20 |

FOREIGN PATENT DOCUMENTS

| | | |
|---|---|---|
| DE | 102007015578 A | 10/2008 |
| EP | 1777135 A1 | 4/2007 |
| EP | 1777135 A1 | 4/2007 |
| GB | 2216684 A | 10/1989 |
| GB | 2216684 A | 11/1989 |
| RU | 2006128503 A | 7/2006 |
| RU | 2422316 C1 | 12/2009 |
| SU | 1768430 A1 | 6/1989 |

OTHER PUBLICATIONS

Shaofeng Lu, "Optimising Power Management Strategies for Railway Traction Systems" TUB Ph.D Thesis, Oct. 2011.

Khmelnitsky E., "On an Optimal Control Problem of Train Operation", IEEE Transactions on Automatic Control Jul. 2000. vol. 45,issue 7,pp. 1257-1266.

Russian Office Action for Application No. 2014/2536.1 filed Apr. 30, 2013.6 pages. English translation included.

ISR and WO for PCT/US2013/038764 dated Jun. 25, 2014 (13 pgs.).

* cited by examiner

SYSTEM AND METHOD FOR CONTROLLING VELOCITY OF A VEHICLE

FIELD

Embodiments of the inventive subject matter relate to vehicle control.

BACKGROUND

Vehicles travel to move cargo and/or passengers along a route and/or network of interconnected routes. These vehicles may operate according to rules to ensure the safety of the cargo, passengers, and operators of the vehicles. These rules may differ from the regulations or laws created by governmental or regulatory entities. For example, while governments and regulatory bodies may create speed limits that restrict how fast vehicles may travel in order to reduce accidents and/or the severity of accidents caused by vehicles traveling too fast, other entities may create rules to dictate operation of the vehicles. As one example, a company that owns and operates a locomotive may create rules that restrict how the locomotive can be operated in order to ensure the safety of the operator, passengers, and cargo, and/or to reduce wear on the track, cars, or locomotive.

With respect to locomotives, one such rule is a limitation on how slowly an operator can control the locomotive to move when an air brake is partially applied. If the locomotive is moving below a speed limit, such as 20 miles per hour or 32 kilometers per hour, and the air brake of the locomotive or the train that includes the locomotive is partially applied (such as by dropping the air pressure in a reservoir of the air brake by 10 lbs or 4.5 kg of air pressure) to slow down, but not stop, the locomotive or train, then a rule of the locomotive may cause a control system of the locomotive to automatically fully engage the brakes to stop the locomotive. This rule may further require the locomotive to remain stationary while a compressor of the locomotive or train increases the air pressure in the air brake to at least a designated threshold. At that point, the locomotive or train can continue moving.

Such a rule may be useful in situations where an operator of a locomotive is partially applying the air brakes of the locomotive to slow down the locomotive on a downhill graded portion of a route. The rule can prevent the operator from depleting too much air pressure from the air brakes. For example, if the operator were allowed to continue bleeding off the air in the air brakes, then there may be insufficient air pressure to operate the brakes should the need arise (e.g., while the compressor is working to increase the air pressure).

However, such a rule also can inhibit movement of the vehicle (e.g., locomotive or train). For example, the operator may unknowingly operate the vehicle slower than necessary and, when the brakes are partially applied, the operator unintentionally causes the vehicle to fully stop and remain stationary for a period of time. As a result, the vehicle is unable to continue to its scheduled destination on time.

BRIEF DESCRIPTION

In one embodiment, a control system includes an onboard controller, a location determination system, and a speed data sensor. The controller is configured to identify a designated area along a route being traveled by a vehicle. The designated area includes one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route. The designated area is associated with an operating rule that requires the vehicle to travel at least as fast as a designated lower speed limit. The location determination system is configured to monitor actual locations of the vehicle as the vehicle travels along the route. The speed data sensor is configured to obtain speed data representative of an actual velocity of the vehicle. The controller also is configured to restrict control of the vehicle such that the actual velocity of the vehicle is at least as fast as the lower speed limit of the designated area when the vehicle travels in the designated area.

In another embodiment, a method (e.g., for controlling a vehicle) includes identifying a designated area along a route being traveled by a vehicle. The designated area includes one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route. The designated area is associated with an operating rule that requires the vehicle to travel at least as fast as a designated lower speed limit. The method also includes monitoring actual locations of the vehicle as the vehicle travels along the route, monitoring actual velocity of the vehicle, and controlling the vehicle such that the actual velocity of the vehicle is at least as fast as the lower speed limit of the designated area when the vehicle travels in the designated area.

In another embodiment, a control system (e.g., for a vehicle) is provided and includes an onboard controller, a location determination system, and a speed data sensor. The controller is configured to identify a designated area along a route being traveled by a vehicle. The designated area is associated with a brake operating rule that requires engagement of a brake of the vehicle to stop the vehicle if the vehicle travels at a velocity slower than a lower speed limit in the designated area. The location determination system is configured to monitor actual locations of the vehicle as the vehicle travels along the route. The speed data sensor is configured to obtain speed data representative of an actual velocity of the vehicle. The controller also is configured to restrict control of the vehicle such that the actual velocity of the vehicle is at least as fast as the lower speed limit when the vehicle travels in the designated area.

BRIEF DESCRIPTION OF THE DRAWINGS

Reference is now made briefly to the accompanying drawings, in which.

DETAILED DESCRIPTION

One or more embodiments of the inventive subject matter described herein relate to systems and methods for controlling velocities of vehicles as the vehicles travel along a route in order to prevent the vehicles from traveling slower than designated lower speed limits associated with designated areas along the route. The lower speed limits may be part of operating rules that limit how slowly vehicles can travel through the designated areas (e.g., without triggering automatic braking) and can be established for various reasons, such as safety, efficiency (e.g., of moving the vehicles through a network of the routes), and the like.

Figure 1:
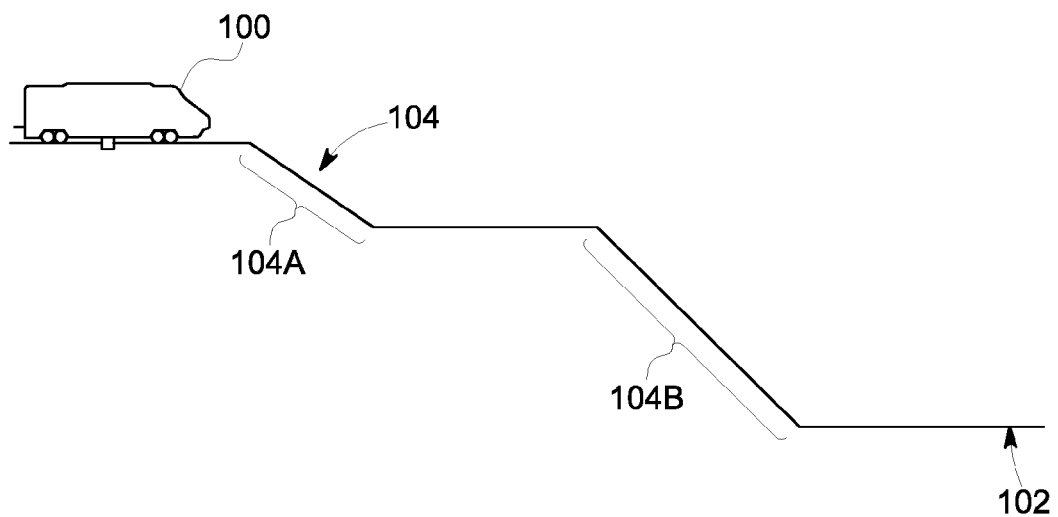
FIG. 1 is a schematic diagram of a vehicle traveling along a route in accordance with one embodiment.

FIG. 1 is a schematic diagram of a vehicle 100 traveling along a route 102 in accordance with one embodiment of the inventive subject matter. The vehicle 100 is illustrated as a rail vehicle (e.g., a locomotive), but alternatively may be another type of rail vehicle, an off highway vehicle other than a rail vehicle, an automobile, marine vessel, airplane, or the like. The route 102 represents a surface on which the vehicle 100 travels, such as a track, road, waterway, airborne pathway, and the like. The route 102 includes several downhill sections 104 (e.g., sections 104A, 104B) having a negative grade. The downhill sections 104 may be referred to as designated areas of the route 102 that are associated with operating rules that restrict how slowly the vehicle 100 can travel through the sections 104. For example, with respect to rail vehicles having air brakes, the downhill sections 104 may be associated with lower speed limits that require the vehicles to travel faster than the lower speed limits in order to prevent operators of the vehicles from draining or bleeding off the air pressure in the air brakes while the vehicles travel through the sections 104. Such draining or bleeding off of the air pressure can result in the vehicles having insufficient air pressure to continue safely controlling the vehicles after the vehicles pass through the sections 104.

Different operating rules may be associated with the different sections 104. For example, the second downhill section 104B may have a more severe downhill grade than the first downhill section 104A and, as a result, the section downhill section 104B may have a faster lower speed limit than the first downhill section 104A. The operating rules for the sections 104 may be created by an entity that owns or operates the vehicle 100, such as a railroad company. For example, in contrast to the speed limits set by governmental or regulatory bodies, the lower speed limits may be different from the government or regulatory speed limits and may be established by the company that owns the vehicle 100.

As described below, in order to prevent the vehicle 100 from violating the operating rules, the vehicle 100 may autonomously maintain a velocity that exceeds the speed limits of the operating rules and/or direct an operator how to maintain the velocity above the lower speed limits. When the vehicle 100 enters or approaches the designated areas associated with the operating rules and the vehicle 100 is traveling or will be traveling slower than the lower speed limits, the vehicle 100 may then automatically increase the velocity or direct the operator to increase the velocity above the lower speed limits. In one embodiment, the designated areas of the operating rules do not extend over the entire route 102. For example, the designated areas may represent subsets of the total area that encompasses the route 102. Alternatively, a designated area may encompass the entire route 102 such that the operating rule associated with the designated area applies to limit movement of the vehicle 100 (e.g., by requiring the vehicle 100 to travel faster than a lower speed limit).

The controller 202 can prevent the vehicle 100 from violating the operating rules when being manually controlled by an operator of the vehicle 100 by ignoring or prohibiting commands from the operator that would cause the vehicle 100 to travel slower than the lower speed limits in the designated areas. For example, if the operator attempts to decrease the throttle setting of the vehicle 100 as the vehicle 100 approaches the designated area or when the vehicle 100 is within the designated area such that the vehicle 100 would slow down below the lower speed limit of the designated area, the controller 202 may ignore the change in throttle setting and not issue any signals to a propulsion system of the vehicle 100 (e.g., an engine, traction motors, and the like) to cause the propulsion system to slow down the vehicle 100. Alternatively, the controller 202 may mechanically lock a throttle lever that is used to manually control the speed of the vehicle 100 so that the operator cannot slow down the vehicle 100 below the lower speed limit.

In another embodiment, the vehicle 100 may autonomously maintain a velocity that exceeds the speed limits of the operating rules and/or direct an operator how to maintain the velocity above the lower speed limits. When the vehicle 100 enters or approaches the designated areas associated with the operating rules and the vehicle 100 is traveling or will be traveling slower than the lower speed limits, the vehicle 100 may then automatically increase the velocity or direct the operator to increase the velocity above the lower speed limits. In one embodiment, the designated areas of the operating rules do not extend over the entire route 102. For example, the designated areas may represent subsets of the total area that encompasses the route 102. Alternatively, a designated area may encompass the entire route 102 such that the operating rule associated with the designated area applies to limit movement of the vehicle 100 (e.g., by requiring the vehicle 100 to travel faster than a lower speed limit).

Alternatively or additionally, the vehicle 100 may be traveling according to a trip plan that designates operational settings (e.g., throttle settings, brake settings, power output of motors, speed, acceleration, and the like) of the vehicle 100 as a function of time elapsed during a trip along the route 102 and/or distance along the route 102. The trip plan may be created in order to reduce at least one of fuel consumed or emissions generated by the vehicle 100 relative to the vehicle 100 traveling along the route 102 according to one or more different operational settings, while still causing the vehicle 100 to arrive at one or more designated locations at scheduled arrival times. The trip plan can be created or modified (if already using a previously created trip plan) to ensure that the vehicle 100 travels at or above the lower speed limits when traveling through the designated areas associated with the operating rules, even if doing so results in slightly increased fuel consumption and/or emission generation.

Figure 2:
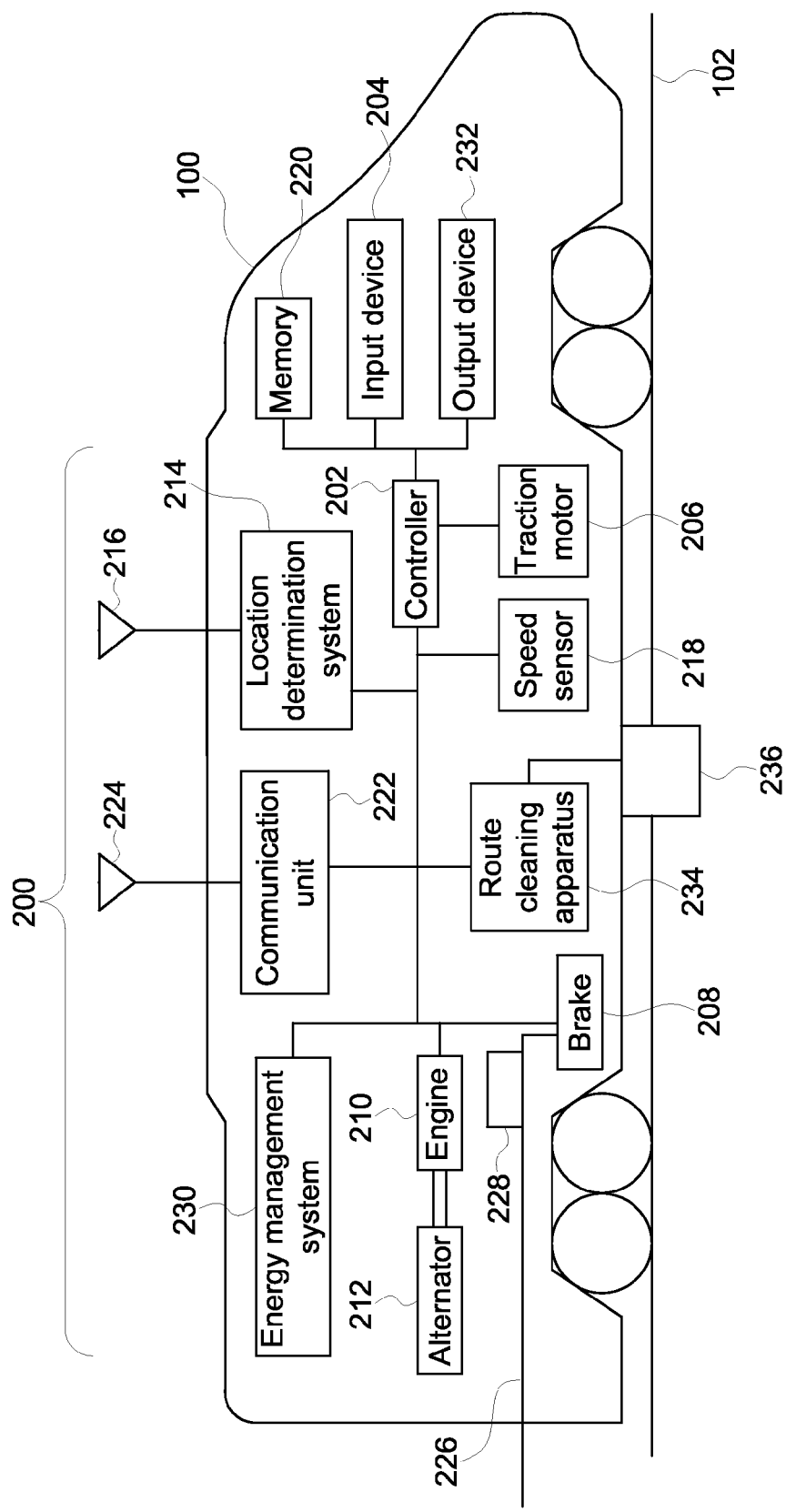
FIG. 2 illustrates one embodiment of the vehicle shown in FIG. 1.

FIG. 2 illustrates one embodiment of the vehicle 100. The vehicle 100 includes an onboard control system 200 that controls operations of the vehicle 100. The control system 200 includes an onboard controller 202 that is used to autonomously and/or manually control movement of the vehicle 100. The controller 202 may include or represent instructions (e.g., software, hard-wired instructions, and the like) and/or associated hardware and circuitry (e.g., one or more processors, microcontrollers, and the like) that perform functions described herein. The controller 202 can be coupled with an input device 204 (e.g., one or more switches, levers, touch screens, keyboards, and the like) that receive manual input from an operator of the vehicle 100 to control operations of the vehicle 100. The controller 202 is operatively connected (e.g., by one or more wired and/or wireless connections) with one or more traction motors 206, brakes 208, engines 210, and alternators 212 to control the operations of the vehicle 100. For example, the controller 202 may generate control signals that are sent to the motor 206, brake 208, engine 210, alternator 212, to control the speed, acceleration, power output, braking, and the like, of the vehicle 100.

The controller 202 monitors the actual locations of the vehicle 100 as the vehicle 100 travels along the route 102 based on the data or signals received from a location determination system 214 and/or a speed data sensor 218 of the control system 200. The location determination system 214 obtains data representative of an actual location of the vehicle 100. The location determination system 214 may wirelessly receive signals using transceiver and associated circuitry (shown as an antenna 216 in FIG. 2), such as signals transmitted by Global Positioning System satellites, signals transmitted by cellular networks, and the like. The location determination system 214 may use these signals to determine the location of the vehicle 100 and/or convey the signals to the controller 202 for determining the location of the vehicle 100. In another embodiment, the controller 202 may receive speed data indicative of the velocity of the vehicle 100 from a speed sensor 218 of the vehicle 100. The controller 202 may determine the velocity of the vehicle 100 based on the speed data and can use an amount of time elapsed since passing or leaving a designated location in order to determine the current location of the vehicle 100.

The controller 202 identifies designated areas (e.g., downhill sections 104 shown in FIG. 1) of the route 102 that are associated with operating rules. In one embodiment, the operating rules are stored in a memory 220 of the vehicle 100, such as a tangible and non-transitory computer hard drive, disc, and the like. Additionally or alternatively, the operating rules are received by the controller 202 from an off-board location. For example, the control system 200 may include a communication unit 222 (e.g., transceiver circuitry and hardware, such as a wireless antenna 224) that wirelessly receives the operating rules from a dispatch. The operating rules can be updated as the vehicle 100 travels, such as by the communication unit 222 receiving new or updated operating rules when the vehicle 100 enters and/or leaves various areas or locations.

In one embodiment, the operating rules include a brake operating rule that requires the controller 202 to automatically engage the brake 208 and stop movement of the vehicle 100 if the vehicle 100 travels at a velocity that is slower than a lower speed limit in a designated area. For example, if the vehicle 100 slows down below the lower speed limit, then a brake operating rule may require the controller 202 to direct the brake 208 to engage and stop movement of the vehicle 100. The brake 208 may be an air brake that is connected to an air brake line 226. When air pressure in the brake line 226 (and/or in an air reservoir or bladder fluidly coupled with the brake line 226) falls below a threshold pressure, such as by opening one or more valves, the brake 208 engages to slow down and eventually stop movement of the vehicle 100. After the brake 208 is engaged, air pressure in the brake line 226 (and/or reservoir) may be increased, such as by operation of a compressor or other device that adds air to the brake line 226 (and/or reservoir). Once the air pressure increases a sufficient amount (e.g., above the threshold), the brake 208 may release so that the vehicle 100 can continue moving again. An air pressure sensor 228 fluidly coupled with the brake 208 and/or the brake line 226 may provide pressure data to the controller 202 that is indicative of the air pressure in the brake 208, brake line 226, and/or reservoir. The controller 202 can use this data to monitor the air pressure of the brake 208.

As the vehicle 100 travels along the route 102, the controller 202 restricts control of the vehicle 100 such that the actual velocity of the vehicle 100 is at least as fast as the lower speed limit of the operating rule when the vehicle 100 is in the designated area associated with the operating rule. The controller 202 can monitor where the vehicle 100 is located during travel of the vehicle 100 in order to determine when the vehicle 100 enters or is approaching a designated area associated with one or more operating rules. The controller 202 compares the actual speed of the vehicle 100 (or an estimated speed of the vehicle 100 when the vehicle 100 will enter the designated area) to the lower speed limit of the designated area to determine if the actual speed is slower than the lower speed limit and/or will be slower than the lower speed limit when the vehicle 100 enters the designated area.

If the actual speed is or will be slower than the lower speed limit, then the controller 202 may automatically change operational settings of the vehicle 100 to speed up the vehicle 100 to a velocity that is no less than the lower speed limit. For example, if the operator is manually controlling the vehicle 100 to move at a speed slower than the lower speed limit in the designated area and/or is decreasing the speed of the vehicle 100 such that the vehicle 100 will travel slower than the lower speed limit in the designated area, the controller 202 may ignore the manual changes to the operational settings of the vehicle 100. Alternatively or additionally, the controller 202 can monitor the manually input changes to a throttle of the vehicle 100 and prevent the manually input changes from being implemented when the manually input changes would cause the vehicle 100 to travel below the lower speed limit when the vehicle 100 is in the designated area.

The control system 200 also may include an energy management system 230 that creates and/or modifies a trip plan for the vehicle 100 to travel along the route 102 for a trip, as described above. The energy management system 230 may include one or more sets of instructions (e.g., software, hard-wired instructions, and the like) and/or hardware and circuitry (e.g., one or more processors, controllers, and the like) that perform the functions of creating and/or modifying the trip plan. The controller 202 accesses the trip plan (e.g., from the energy management system 230) to automatically control the vehicle 100 according to the designated operational settings of the trip plan and/or to direct the operator of the vehicle 100 how to control the vehicle 100 according to the trip plan. For example, the controller 202 may present the operator with instructions on how to manually change the actual operational settings of the vehicle 100 to follow or correspond to the designated operational settings of the trip plan. The operator may then manually control the vehicle 100 according to the trip plan.

The controller 202 can present the instructions to the operator on an output device 232 of the vehicle 100, such as a display device, speaker, touchscreen, haptic device (e.g., device that vibrates, changes temperature, or otherwise uses haptic effects to communicate information to the operator), and the like.

The energy management system 230 can identify the designated areas associated with the operating rules by examining the operating rules. The energy management system 230 may then create or modify the designated operational settings of the trip plan to ensure that the operational settings cause the vehicle 100 to travel faster than the lower speed limit of the operating rule in the designated area prior to the vehicle 100 entering the designated area.

Figure 3:
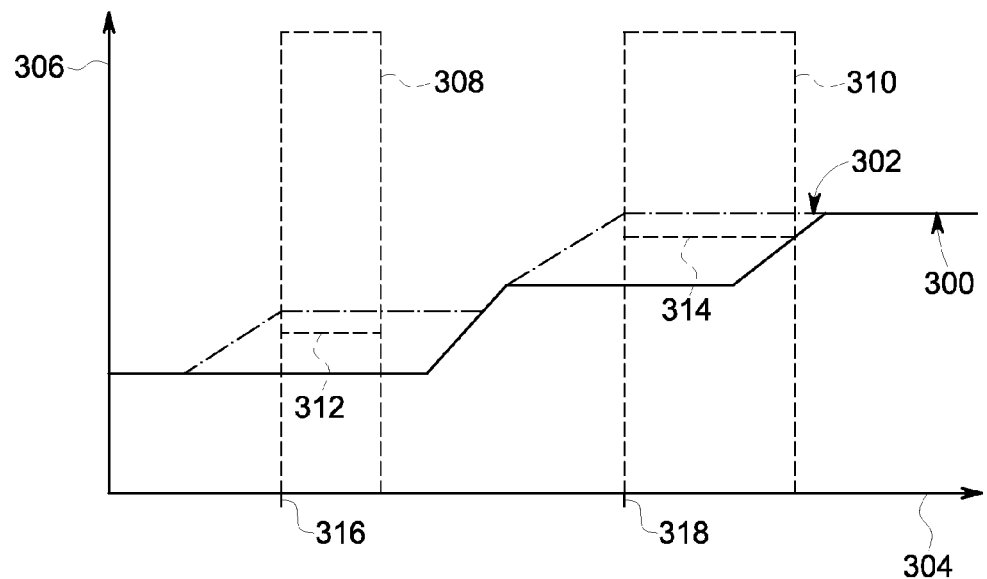
FIG. 3 illustrates velocity curves of the vehicle shown in FIG. 1 in accordance with one example.

FIG. 3 illustrates velocity curves 300, 302 of the vehicle 100 (shown in FIG. 1) in accordance with one example of the inventive subject matter described herein. The velocity curves 300, 302 is shown alongside a horizontal axis 304 representative of time elapsed during a trip or distance along the route 102 (shown in FIG. 1) and a vertical axis 306 representative of the velocity of the vehicle 100.

Designated areas 308, 310 represent areas along the route 102 where operating rules apply to require the vehicle 100 to travel at least as fast as associated lower speed limits 312, 314. In one embodiment, the designated areas 308, 310 may include the downhill sections 104A, 104B shown in FIG. 1, respectively. The designated areas 308, 310 may geographically extend beyond the downhill sections 104. For example, beginning locations 316, 318 of the designated areas 308, 310 may be located ahead or upstream of the start of the downhill locations 104 along the direction of travel of the vehicle 100. Establishing the designated areas 308, 310 to begin prior to the downhill sections 104 may ensure that the vehicle 100 has sufficient time to maintain its speed above the lower speed limit 312, 314 of the designated area 308, 310 and/or to accelerate above the lower speed limit 312, 314 before reaching the downhill sections 104.

The velocity curve 300 represents potential velocities of the vehicle 100 traveling along the route 102 without the controller 202 (shown in FIG. 2) preventing the vehicle 100 from traveling slower than the lower speed limits 312, 314 of the designated areas 308, 310. As shown in the velocity curve 300 of FIG. 3, the vehicle 100 may travel at speeds slower than the lower speed limits 312, 314 in each of the designated areas 308, 310 if the controller 202 does not prevent such operations. As a result, the controller 202 would automatically engage the brake 202 (shown in FIG. 2) to stop the vehicle 100 for a sufficiently long period of time to allow the air pressure of the brake 202 to reach a threshold pressure.

In order to prevent the controller 202 from automatically stopping the vehicle 100, the vehicle 100 may be operated at the velocity curve 302. As shown in FIG. 3, the velocity curve 302 has speeds in excess of the lower speed limits 312, 314 when the vehicle 100 is located in the designated areas 308, 310. The vehicle 100 may have other velocities that do not exceed one or more of the lower speed limits 312, 314 when the vehicle 100 is outside of the designated areas 308, 310.

As the vehicle 100 is approaching the designated area 308, 310, the controller 202 may determine the current speed of the vehicle 100 (e.g., from speed data obtained from the sensor 218 shown in FIG. 2), the lower speed limit 312, 314 of the approaching designated area 308, 310 (e.g., from the operating rule stored in the memory 220 shown in FIG. 2), a current location of the vehicle 100 (e.g., from data obtained from the location determination system 214 shown in FIG. 2), and/or an entry location representative of where the vehicle 100 will enter into the designated area 308, 310 (e.g., from the operating rule stored in the memory 220). Based on some or all of this information, the controller 202 can determine a speed difference as the difference between the current speed of the vehicle 100 and the lower speed limit 312, 314 of the designated area 308, 310 that is being approached by the vehicle 100 and a distance to the designated area 308, 310 as the distance along the route 102 (shown in FIG. 1) from the current location to the entry location of the designated area 308, 310. The controller 202 may obtain terrain information that represents the grade, curvature, and the like, of the portion of the route 102 that extends from the current location of the vehicle 100 to the entry location of the designated area 308, 310. The terrain information may be stored in and accessible from the memory 220 or received from an off-board location via the communication unit 222 (shown in FIG. 2). The controller 202 may obtain vehicle information that includes data representative of the vehicle 100, such as the size (e.g., length), weight, distribution of weight along the length of the vehicle 100, distribution of powered units (e.g., cars or units such as locomotives in a vehicle 100 that includes several cars or units mechanically coupled with each other) along the length of the vehicle 100, power outputs of the powered units, and the like. The vehicle information may be stored in and accessible from the memory 220 or received from an off-board location via the communication unit 222 (shown in FIG. 2).

Based on the speed difference, the distance, the terrain information, and/or the vehicle information, the controller 202 may determine the changes in operational settings that can be used to increase the speed of the vehicle 100 to the lower speed limit 312, 314 of the designated area 308, 310 that the vehicle 100 is approaching. For example, the controller 202 may take into account how much the speed of the vehicle 100 has to increase in order to reach the lower speed limit 312, 314, how far the vehicle 100 has to increase the speed to the lower speed limit 312, 314, and how much acceleration is needed to increase the speed to the lower speed limit 312, 314 (e.g., taking into account the terrain information, the vehicle information, and the available distance to the designated area 308, 310), and from this information, determine recommended changes to the operational settings of the vehicle 100 (e.g., increases in throttle settings) at various locations between the current location and the designated area 308, 310.

In one embodiment involving manual control of the vehicle 100, the controller 202 may generate signals that direct the output device 232 (shown in FIG. 2) to display the recommended changes to the operational settings. Additionally or alternatively, the output device 232 may be directed by the controller 202 to display a notification to an operator of the vehicle 100 that the vehicle 100 is approaching a designated area 308, 310, such as by displaying a time before entry of the vehicle 100 in the designated area 308, 310 and/or a map showing the location of the vehicle 100 and the location of the designated area 308, 310. The controller 202 may direct the output device 232 to display other information, such as the current speed of the vehicle 100 and/or the lower speed limit 312, 314 of the approaching designated area 308, 310. The operator may then control the vehicle 100 according to the recommended changes as the vehicle 100 approaches the designated area 308, 310 to ensure that the vehicle 100 is traveling at least as fast as the lower speed limit 312, 314.

In another embodiment involving automatic control of the vehicle 100, the controller 202 may generate signals to automatically control the operations of the vehicle 100 such that the vehicle 100 is traveling at or above the lower speed limit 312, 314 when the vehicle 100 enters the designated area 308, 310. The controller 202 may communicate the signals to the traction motors 206, brakes 208, and/or other components that control tractive effort provided by the vehicle 100 as the vehicle 100 approaches the designated area 308, 310 to implement the recommended changes described above. As a result, the vehicle 100 is automatically controlled so that the speed of the vehicle 100 is no less than the lower speed limit 312, 314 when the vehicle 100 enters the designated area 308, 310.

Figure 4:
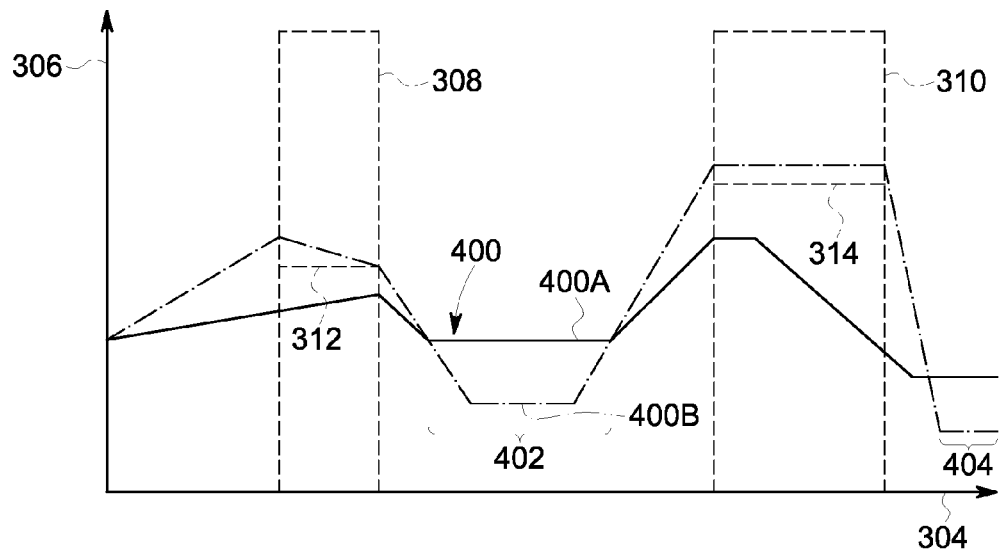
FIG. 4 illustrates trip plans created by an energy management system shown in FIG. 2 of the vehicle shown in FIG. 1 or created by an off-board source (such as a dispatch location) in accordance with one example.

FIG. 4 illustrates trip plans 400 (e.g., trip plans 400A, 400B) created by the energy management system 230 (shown in FIG. 2) of the vehicle 100 (shown in FIG. 1) in accordance with one example. The trip plans 400 represent designated velocities that the vehicle 100 is to travel according to along a trip. The trip plans 400 are shown alongside the horizontal and vertical axes 304, 306 described above in connection with FIG. 3, and the designated areas 308, 310 and corresponding lower speed limits 312, 314 also are shown.

The trip plan 400A represents a trip plan that may be generated by the energy management system 230 in order to reduce fuel consumed and/or emissions generated by the vehicle 100 (relative to one or more other trip plans) without taking into consideration the lower speed limits 312, 314 of the designated areas 308, 310. For example, the trip plan 400A may be the plan generated by the energy management system 230 in the absence of the operating rules that establish the areas 308, 310 and lower speed limits 312, 314. As shown, however, following the trip plan 400A would result in the vehicle 100 being forced to stop and re-set the brakes 208 (shown in FIG. 2) due to the vehicle 100 traveling slower than the lower speed limits 312, 314 in the designated areas 308, 310, as described above.

The energy management system 230 can modify the trip plan 400A to the modified trip plan 400B that directs the vehicle 100 to travel at speeds that meet or exceed the lower speed limits 312, 314 when the vehicle 100 is in the designated areas 308, 310. The increased speeds of the vehicle 100 in the designated areas 308, 310, however, may cause the vehicle 100 to consume more fuel and/or generate more emissions than following the trip plan 400A. As a result, the energy management system 230 may direct the vehicle 100 to travel at speeds slower than the trip plan 400A in other portions of the route 102 (shown in FIG. 1), such as the portions of the route 102 that correspond to slower areas 402, 404 in FIG. 4. Traveling slower than the trip plan 400A in at least some areas of the route 102 can reduce the fuel consumed and/or emissions generated by the vehicle 100 to levels that are as low or slightly above the levels achievable using the trip plan 400A. The modified trip plan 400B may be referred to as a best alternative trip plan where the modified trip plan 400B does not reduce fuel consumed and/or emissions generated as much as the trip plan 400A, but does reduce fuel consumed and/or emissions generated relative to traveling according to one or more other trip plans that direct the vehicle 100 to travel at least as fast as the lower speed limits 312, 314 in the designated areas 308, 310.

Figure 5:
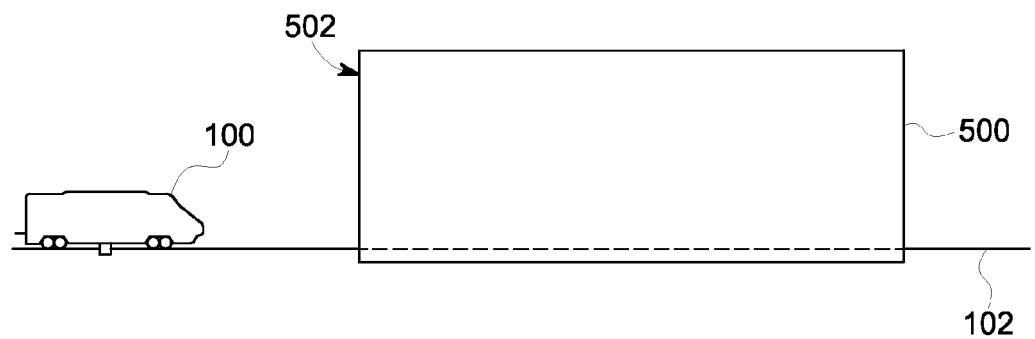
FIG. 5 is a schematic diagram of the vehicle shown in FIG. 1 traveling along a route that passes through an airflow restricted area in accordance with one embodiment.

FIG. 5 is a schematic diagram of the vehicle 100 traveling along the route 102 that passes through an airflow restricted area 500 in accordance with an embodiment of the inventive subject matter. The airflow restricted area 500 represents a portion of the route 102 that has reduced air and/or air movement relative to other portions of the route 102. For example, the airflow restricted area 500 may represent a tunnel through which the route 102 extends, a portion of the route 102 that extends within a city (having reduced airflow between tall buildings), a portion of the route 102 that extends between relatively tall hills, mountains, and the like (e.g., at the bed of a valley), a portion of the route 102 that passes over relatively high altitudes, and the like. The reduced airflow in the area 500 can be problematic for vehicles 100 that operate using combustion engines (e.g., engine 210 shown in FIG. 2) or other mechanisms that consume air (e.g., an environment of predominantly nitrogen and oxygen) to perform work. For example, in relatively long tunnels, the airflow may be restricted such that the available air for combusting the fuel in the engine 210 is reduced. As a result, the engine 210 of the vehicle 100 may be limited or restricted in the power that the engine 210 can produce while in the airflow restricted area 500. Alternatively or additionally, the airflow may be restricted in the area 500 such that travel of the vehicle 100 below a designated speed threshold or limit results in the engine 210 stalling.

The airflow restricted area 500 can be associated with an operating rule similar to the downhill sections 104 (shown in FIG. 1) of the route 102. For example, the designated areas 308, 310 (shown in FIGS. 3 and 4) can include or represent one or more airflow restricted areas 500 that are associated with corresponding lower speed limits 312, 314 (shown in FIGS. 3 and 4). The lower speed limits 312, 314 may be established to prevent the engine 210 of the vehicle 100 from stalling within the area 500, such as when the engine 210 abruptly stops or slows due to insufficient airflow. For example, the lower speed limits 312, 314 can be sufficiently fast that the vehicle 100 moves into, through, and exits the area 500 in a sufficiently short period of time that the time period during which airflow to the engine 210 is restricted is insufficient enough to cause the engine 210 to stall.

The lower speed limits 312, 314 may vary based on a variety of factors. For example, the lower speed limits 312, 314 may increase for larger airflow restricted areas 500, such as longer tunnels, valleys, and the like. The lower speed limits 312, 314 may be increased so that the vehicle 100 spends less time in the airflow restricted area 500 and, as a result, the probability of the engine 210 stalling decreases. The lower speed limits 312, 314 also may increase for larger vehicles 100, such as vehicles 100 that include several powered units (e.g., locomotives) interconnected with each other. In one embodiment, the lower speed limits 312, 314 may be increased when the vehicle 100 has powered units distributed along the length of the vehicle 100. For example, the lower speed limits 312, 314 may be reduced for a shorter vehicle 100 and/or a vehicle 100 having most or all of the powered units located near a front or leading end of the vehicle 100, but increased for longer vehicle 100 and/or vehicles 100 having the powered units distributed throughout the length of the vehicle 100 or located at a back or trailing end of the vehicle 100. The lower speed limits 312, 314 may be based on the length and/or distribution of powered units in the vehicle 100 so that the engines 210 in the vehicle 100 (e.g., in the powered units) spend less time in the airflow restricted areas 500. As a result, the probability of one or more of the engines 210 stalling decreases.

The designated area 308, 310 associated with the airflow restricted area 500 may begin ahead of an entry location 502 of the area 500 so that the vehicle 100 has sufficient speed to move through the area 500 without attempting to accelerate within the area 500 in one embodiment. For example, the entry location 316, 318 (shown in FIG. 3) of the designated area 308, 310 that represents the airflow restricted area 500 may begin ahead of the actual entry location 502 of the airflow restricted area 500 along a direction of travel of the vehicle 100. As a result, the vehicle 100 has some distance (e.g., the distance between the entry location 316, 318 of the designated area 308, 310 and the actual entry location 502 of the airflow restricted area 500) in which to increase speed up to or above the lower speed limit 312, 314 by the time the vehicle 100 actually enters the airflow restricted area 500.

As described above, in order to prevent the vehicle 100 from traveling slower than the lower speed limits 312, 314, the controller 202 may ignore manually entered throttle changes or prevent the manually entered throttle changes from being implemented that would cause the vehicle 100 to reduce speed below the lower speed limits 312, 314 in the designated areas 308, 310. Additionally or alternatively, the controller 202 may automatically control the speed of the vehicle 100 to prevent the vehicle 100 from slowing down below the lower speed limits 312, 314 in the designated areas 308, 310. In another embodiment, the energy management system 230 (shown in FIG. 2) may create or modify the trip plan for the vehicle 100 to prevent the vehicle 100 from traveling slower than the lower speed limits 312, 314 in the designated areas 308, 310, as described above.

The controller 202 may control or direct the control of the vehicle 100 so that the vehicle 100 is traveling fast enough and/or has enough energy (e.g., kinetic energy plus potential energy) when the vehicle 100 enters the airflow restricted area 500 that the vehicle 100 will travel through the airflow restricted area 500 at speeds that are at least as fast as the lower speed limit associated with the airflow restricted area 500 throughout the airflow restricted area 500. As one example, the controller 202 may speed up the vehicle 100 above the lower speed limit so that the vehicle 100 can travel at least as fast as the lower speed limit throughout the airflow restricted area 500, even with the vehicle 100 slowing down when traveling in the airflow restricted area 500.

Figure 6:
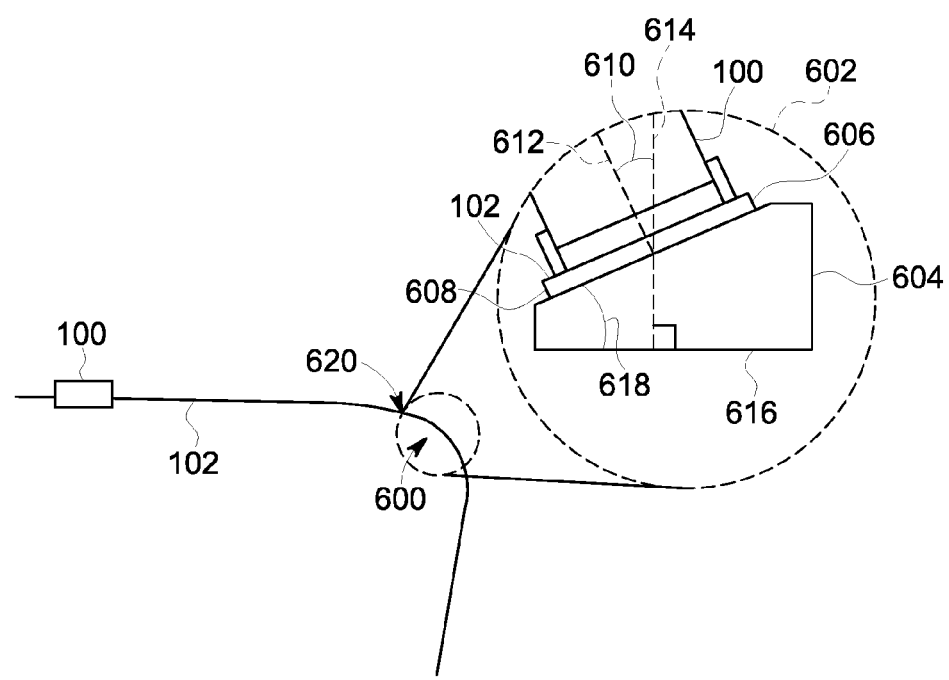
FIG. 6 is a schematic diagram of the vehicle shown in FIG. 1 traveling along the route that includes a banked section.

FIG. 6 is a schematic diagram of the vehicle 100 traveling along the route 102 that includes a banked section 600 in accordance with one embodiment. An inset 602 of FIG. 6 shows a cross-sectional view of the route 102 and terrain 604 below the route 102 at the banked section 600. The banked section 600 of the route 102 is banked, or tilted such that one lateral side 606 of the route 102 is disposed higher (e.g., at a greater elevation) than an opposite lateral side 608 of the route 102. The lateral sides 606, 608 are disposed on opposite sides of the route 102 such that the vehicle 100 travels along the route 102 in a direction that extends between the lateral sides 606, 608 and does not intersect the lateral sides 606, 608. The banked section 600 may be banked in order to prevent vehicles 100 traveling at relatively fast speeds from tilting too much and coming off of the route 102. For example, without banking the banked section 600, the linear momentum of a vehicle 100 traveling too fast on the banked section 600 may cause the vehicle 100 to tilt over and fall off of the route 102. Banking the route 102 allows for the vehicles to travel faster on the banked section 600 without tilting over.

Traveling too slow on the banked section 600, however, may result in the vehicle 100 tilting too much in an opposite direction, such as toward the lower lateral side 608. For example, the energy management system 230 (shown in FIG. 2) of the vehicle 100 may create a trip plan that causes the vehicle 100 to travel too slow on the banked section 600 in order to reduce fuel consumed and/or emissions generated by the vehicle 100. For vehicles 100 that are relatively tall and/or have an uneven vertical distribution of mass toward an upper or top side of the vehicles 100, traveling too slow can cause the vehicles 100 to tilt too far toward the lower lateral side 608. For example, the vehicles 100 may tilt by more than a designated tilt threshold. The tilt of the vehicle 100 may be measured by a sensor, such as an accelerometer or other device onboard the vehicle 100. The tilt may be represented by an angle 610 at which a vertical plane or line 612 of the vehicle 100 is disposed with respect to a vertical reference plane or line 614 that is disposed normal to a reference plane 616 of the terrain 604, such as the surface of the earth prior to creating the banked portion of the terrain 604.

The banked section 600 of the route 102 may be identified as a designated banked area that is associated with an operating rule similar to the downhill sections 104 (shown in FIG. 1) and/or airflow restricted areas 500 (shown in FIG. 5) of the route 102. For example, the designated areas 308, 310 (shown in FIGS. 3 and 4) can include or represent one or more banked sections 600 that are associated with corresponding lower speed limits 312, 314 (shown in FIGS. 3 and 4). The lower speed limits 312, 314 may be established to prevent the vehicle 100 from tilting too far, such as when the actual tilt 610 of the vehicle 100 exceeds a tilt threshold. For example, the lower speed limits 312, 314 can be sufficiently fast that the tilt 610 of the vehicle 100 is reduced below a tilt threshold such that the risk of the vehicle 100 toppling over is reduced.

The lower speed limits 312, 314 may vary based on a variety of factors. For example, the lower speed limits 312, 314 may increase for larger bank angles 618 or decrease for smaller bank angles 618. The bank angle 618 represents the angle at which the route 102 is angled with respect to the reference plane 616 of the terrain 604. As the bank angle 618 increases, the risk of the vehicle 100 tilting too far at slower speeds can increase. The lower speed limits 312, 314 may increase for taller vehicles 100 and/or for vehicles 100 having an uneven vertical distribution of weight, such as vehicles 100 that are heavier toward the upper or top sides of the vehicles 100 (e.g., that are farther from the route 102) relative to the lower or bottom sides of the vehicles 100 (e.g., that are closer to the route 102). Conversely, the lower speed limits 312, 314 may decrease for shorter vehicles 100, for vehicles 100 having a more even vertical distribution of weight, and/or for vehicles 100 having an uneven vertical distribution of weight with the weight being concentrated toward the lower or bottom sides of the vehicles 100.

The designated area 308, 310 associated with the banked section 600 of the route 102 may begin ahead of an entry location 620 of the banked section 600 so that the vehicle 100 has sufficient speed to move through the banked section 600 without attempting to accelerate within the banked section 600 in one embodiment. For example, the entry location 316, 318 (shown in FIG. 3) of the designated area 308, 310 that represents the banked section 600 may begin ahead of the actual location 620 at which the bank of the route 102 increases above a threshold, such as when the bank angle 618 exceeds a designated threshold. As a result, the vehicle 100 has some distance (e.g., the distance between the entry location 316, 318 of the designated area 308, 310 and the actual location 620 of the banked section 600) in which to increase speed up to or above the lower speed limit 312, 314 by the time the vehicle 100 actually reaches the banked section 600.

As described above, in order to prevent the vehicle 100 from traveling slower than the lower speed limits 312, 314, the controller 202 may ignore manually entered throttle changes or prevent the manually entered throttle changes from being implemented that would cause the vehicle 100 to reduce speed below the lower speed limits 312, 314 in the designated areas 308, 310. Additionally or alternatively, the controller 202 may automatically control the speed of the vehicle 100 to prevent the vehicle 100 from slowing down below the lower speed limits 312, 314 in the designated areas 308, 310. In another embodiment, the energy management system 230 (shown in FIG. 2) may create or modify the trip plan for the vehicle 100 to prevent the vehicle 100 from traveling slower than the lower speed limits 312, 314 in the designated areas 308, 310, as described above.

The controller 202 may control or direct the control of the vehicle 100 so that the vehicle 100 is traveling fast enough and/or has enough energy (e.g., kinetic energy plus potential energy) when the vehicle 100 enters the banked section 600 that the vehicle 100 will travel through the banked section 600 at speeds that are at least as fast as the lower speed limit associated with the banked section 600 throughout the banked section 600. As one example, the controller 202 may speed up the vehicle 100 above the lower speed limit so that the vehicle 100 can travel at least as fast as the lower speed limit throughout the banked section 600, even with the vehicle 100 slowing down when traveling in the banked section 600.

Returning to the discussion of the vehicle 100 shown in FIG. 2, the vehicle 100 can include a route cleaning apparatus 234 that cleans and/or removes debris from the route 102 as the vehicle 100 travels along the route 102. The cleaning apparatus 234 may include brushes, outlets, and the like (referred to herein as a cleaning device 236), that cleans the route 102 (e.g., removes debris and/or moisture from the route 102). The device 236 may include brushes that engage the route 102, an outlet that directs forced air, liquid, or a cleaning substance (e.g., sand) toward the route 102, and the like. The cleaning apparatus 234 can include the hardware (e.g., control circuitry) that directs the device 236 to clean the route 102.

In one embodiment, the cleaning apparatus 234 directs the device 236 to clean the route 102 based on a velocity of the vehicle 102. For example, the device 236 may include brushes that rotate at speeds that are based on the velocity of the vehicle 102 and/or may include pumps that force air, sand, and the like, toward the route 102 based on the velocity of the vehicle 100. The rotation of the brushes and/or amount of air, sand, and the like, that is forced toward the route 102 may increase with increased velocity of the vehicle 100 or decrease with reduced velocity of the vehicle 100. The brushes and/or pumps that force the air, sand, and the like, toward the route 102 may be powered by movement of the vehicle 100, such as by the brushes and/or pumps being mechanically coupled with the propulsion system of the vehicle 100 and/or powered by the alternator 212 of the vehicle 100.

Traveling too slow in an area of the route 102 that is to be cleaned by the route cleaning apparatus 234, however, may result in the route cleaning apparatus 234 being unable to clean the route 102, such as the route cleaning apparatus 234 being unable to remove the debris and/or moisture from the route 102. For example, traveling at too slow of a velocity may cause the device 326 (e.g., the brushes and/or pumps that force air, sand, and the like, toward the route) to not operate or to operate at such slow speeds that the route 102 is not cleaned.

One or more areas of the route 102 may be identified as designated cleaning areas that are to be cleaned by the route cleaning apparatus 234 when the vehicle 100 travels over the route 102. The designated cleaning areas may be associated with an operating rule similar to the downhill sections 104 (shown in FIG. 1), the airflow restricted areas 500 (shown in FIG. 5), and/or the banked areas 600 of the route 102. For example, the designated areas 308, 310 (shown in FIGS. 3 and 4) can include or represent one or more cleaning areas that are associated with corresponding lower speed limits 312, 314 (shown in FIGS. 3 and 4). The lower speed limits 312, 314 may be established to prevent the vehicle 100 from traveling too slow such that the route cleaning apparatus 234 does not clean the route 102.

The lower speed limits 312, 314 may vary based on a variety of factors. For example, the lower speed limits 312, 314 may increase for certain types of route cleaning apparatuses 234 (e.g., where brushes are used as the device 236) or decrease for other types of route cleaning apparatuses 234 (e.g., where pumps are used as the device 236 to force air, sand, and the like toward the route 102). The lower speed limits 312, 314 may increase for certain types of debris on the route 102 that is to be removed by the route cleaning apparatus 234 (e.g., larger and/or solid debris) or decrease for other types of debris (e.g., moisture on the route 102).

The designated area 308, 310 associated with the cleaning areas of the route 102 may begin ahead of the cleaning areas so that the vehicle 100 has sufficient speed to move through the cleaning areas without having to accelerate within the cleaning areas in one embodiment. For example, the entry location 316, 318 (shown in FIG. 3) of the designated area 308, 310 that represents the cleaning areas may begin ahead of the actual location where debris is to be removed from the route 102. As a result, the vehicle 100 has some distance (e.g., the distance between the entry location 316, 318 of the designated area 308, 310 and the actual cleaning area) in which to increase speed up to or above the lower speed limit 312, 314 by the time the vehicle 100 actually reaches the cleaning area. The route cleaning apparatus 234 may then be sufficiently powered to clean the route 102 in the cleaning area before the vehicle 100 reaches the cleaning area.

Alternatively, the designated area 308, 310 for the cleaning area may not be a previously designated or predetermined area. For example, the designated area 308, 310 may be associated with the current location of the vehicle 100 when the route cleaning apparatus 234 is manually or automatically activated (e.g., turned ON). The operating rules associated with operation of the cleaning apparatus 234 may not have previously designated locations, but may apply whenever the route cleaning apparatus 234 is activated. As a result, the controller 202 may autonomously increase the speed of the vehicle 100, direct the operator to increase the speed of the vehicle 100, and/or prohibit manual control of the vehicle 100 that would cause the vehicle 100 to slow down below the lower speed limit 312, 314 when the apparatus 234 is activated.

In another embodiment, one or more areas of the route 102 may be designated as adverse environmental condition areas of the route 102. These areas represent sections of the route 102 where environmental conditions may negatively impact movement of the vehicle 100. For example, these areas represent sections of the route 102 where tractive efforts provided by the vehicle 100 may be decreased as the vehicle 100 travels over the area due to adverse environmental conditions (e.g., negative externalities caused by sources other than the vehicle 100). As used herein, an "adverse" environmental condition represents an environmental condition that alters movement of the vehicle from a selected or designated movement relative to other environmental conditions. For example, wet, icy, or windy conditions may cause the same vehicle operating at a selected or designated throttle setting to move slower than other (e.g., dry or still) conditions at the same throttle setting. As another example, the environmental conditions (e.g., a strong tailwind) may cause the vehicle to travel faster at a selected or designated throttle setting relative to the vehicle traveling in another environmental condition (e.g., no tailwind). The tractive efforts may be decreased due to significant winds (e.g., sidewinds flowing laterally across the direction of travel of the vehicle 100, headwinds flowing into the vehicle 100 in a direction that is substantially opposite to the direction of travel, and the like), decreased friction coefficients of the route 102 from the route 102 being wet and/or icy, and the like. At least some of the tractive effort generated by the vehicle 100 may be lost due to slippage between the wheels of the vehicle 100 and the route 102. With respect to marine vessels as the vehicle 100, cavitation of the waterway, changing or swirling water currents, and the like, may also decrease how much tractive effort generated by the vehicle 100 is actually used as work to propel the vehicle 100.

The designated adverse environmental condition areas may be associated with operating rules (e.g., adverse environment operating rules) that are similar to the downhill sections 104 (shown in FIG. 1), the airflow restricted areas 500 (shown in FIG. 5), the banked areas 600 (shown in FIG. 6), and/or the cleaning areas of the route 102. For example, the designated areas 308, 310 (shown in FIGS. 3 and 4) can include or represent one or more adverse environmental condition areas that are associated with corresponding lower speed limits 312, 314 (shown in FIGS. 3 and 4). The lower speed limits 312, 314 may be established to prevent the vehicle 100 from traveling too slow such that the vehicle 100 has sufficient speed and/or energy (e.g., kinetic and/or potential energies) to travel through the adverse environmental condition area. For example, if the vehicle 100 does not travel at least as fast as the lower speed limits 312, 314 in or upon entering the designated areas, then the vehicle 100 may have insufficient energy and/or speed to make it through the designated areas due to the environmental conditions.

The controller 202 may control or direct the control of the vehicle 100 so that the vehicle 100 is traveling fast enough and/or has enough energy (e.g., kinetic energy plus potential energy) when the vehicle 100 enters the adverse environmental condition area that the vehicle 100 will travel through the area at speeds that are at least as fast as the lower speed limit associated with the adverse environmental condition area throughout the area. As one example, the controller 202 may speed up the vehicle 100 above the lower speed limit so that the vehicle 100 can travel at least as fast as the lower speed limit throughout the area, even with the vehicle 100 slowing down when traveling in the area.

In another embodiment, one or more areas of the route 102 may be designated as adverse vehicular condition areas of the route 102. These areas represent sections of the route 102 where conditions caused by the vehicle 100 may negatively impact movement of the vehicle 100. For example, these areas represent sections of the route 102 where the vehicle 100 is unable to apply a friction promoting substance (e.g., sand deposited onto the route 102 to increase friction between the wheels of the vehicle 100 and the route 102, air blown onto the route 102 to clear debris on the route 102, and the like) due to the vehicle 100 running out of the substance or otherwise being unable to apply the substance. As a result, tractive efforts provided by the vehicle 100 may be decreased as the vehicle 100 travels over the area due to wheel slippage and the like. These areas also or alternatively may represent sections of the route 102 where tractive efforts provided by one or more powered units of the vehicle 100 (e.g., where the vehicle 100 includes two or more powered unit mechanically interconnected with each other) are limited or reduced due to exhaust generated by other powered units of the vehicle 100. For example, in a vehicle 100 that includes several powered units, the powered units that trail other powered units in the vehicle 100 along a direction of travel of the vehicle 100 (referred to herein as trailing powered units) may have restricted airflow (e.g., reduced air) due to the exhaust generated by the powered units located ahead of the trailing powered units (referred to herein as leading powered units). This restricted airflow may occur in one or more restricted airflow areas 500 (shown in FIG. 5) or other areas of the route 102. As described above, the restricted airflow can reduce the tractive effort provided by the trailing powered units and/or cause engines of the trailing powered units to stall.

The designated adverse vehicular condition areas may be associated with operating rules (e.g., adverse environment operating rules) that are similar to the downhill sections 104 (shown in FIG. 1), the airflow restricted areas 500 (shown in FIG. 5), the banked areas 600 (shown in FIG. 6), the cleaning areas of the route 102, the adverse environmental condition areas of the route 102, and the like. For example, the designated areas 308, 310 (shown in FIGS. 3 and 4) can include or represent one or more adverse vehicular condition areas that are associated with corresponding lower speed limits 312, 314 (shown in FIGS. 3 and 4). The lower speed limits 312, 314 may be established to prevent the vehicle 100 from traveling too slow such that the vehicle 100 has sufficient speed and/or energy (e.g., kinetic and/or potential energies) to travel through the area.

The controller 202 may control or direct the control of the vehicle 100 so that the vehicle 100 is traveling fast enough and/or has enough energy (e.g., kinetic energy plus potential energy) when the vehicle 100 enters the adverse vehicular condition area that the vehicle 100 will travel through the area at speeds that are at least as fast as the lower speed limit associated with the adverse vehicular condition area throughout the area. As one example, the controller 202 may speed up the vehicle 100 above the lower speed limit so that the vehicle 100 can travel at least as fast as the lower speed limit throughout the area, even with the vehicle 100 slowing down when traveling in the area.

In another embodiment, one or more areas of the route 102 may be designated as regulation limiting areas of the route 102. These areas represent sections of the route 102 where regulations, laws, and the like, limit various outputs of the vehicle 100. In one embodiment, these regulations, laws, and the like, do not include upper speed limits of the route 102. These regulations, laws, and the like, may include limitations on the amount of audible noise that can be generated by the vehicle 100, limitations on the amount of exhaust generated by the vehicle 100, or other limitations. These limitations may restrict the tractive effort that can be generated by the vehicle 100 while the vehicle 100 is located in the areas.

The designated regulation limiting areas may be associated with operating rules (e.g., regulatory operating rules) that are similar to the downhill sections 104 (shown in FIG. 1), the airflow restricted areas 500 (shown in FIG. 5), the banked areas 600 (shown in FIG. 6), the cleaning areas of the route 102, the adverse environmental condition areas of the route 102, the adverse vehicular condition areas of the route 10, and the like. For example, the designated areas 308, 310 (shown in FIGS. 3 and 4) can include or represent one or more regulation limiting areas that are associated with corresponding lower speed limits 312, 314 (shown in FIGS. 3 and 4). The lower speed limits 312, 314 may be established to prevent the vehicle 100 from traveling too slow such that the vehicle 100 has sufficient speed and/or energy (e.g., kinetic and/or potential energies) to travel through the area.

The controller 202 may control or direct the control of the vehicle 100 so that the vehicle 100 is traveling fast enough and/or has enough energy when the vehicle 100 enters the regulation limiting areas that the vehicle 100 will travel through the area at speeds that are at least as fast as the lower speed limit associated with the regulation limiting areas throughout the areas. As one example, the controller 202 may speed up the vehicle 100 above the lower speed limit so that the vehicle 100 can travel at least as fast as the lower speed limit throughout the area, even with the vehicle 100 slowing down when traveling in the area.

In another embodiment, one or more areas of the route 102 may be designated as route restriction areas of the route 102. These areas represent sections of the route 102 where the tractive efforts of the vehicle 100 are limited due to one or more conditions or characteristics of the route 102. For example, these areas can include sections of the route 102 that are formed from different (e.g., lighter) materials, sections of the route 102 that are damaged, sections of the route 102 that are under repair, and the like. These conditions of the route 102 may restrict the tractive effort that can be generated by the vehicle 100 while the vehicle 100 is traveling in the areas.

The designated route restriction areas may be associated with operating rules (e.g., route restriction operating rules) that are similar to the downhill sections 104 (shown in FIG. 1), the airflow restricted areas 500 (shown in FIG. 5), the banked areas 600 (shown in FIG. 6), the cleaning areas of the route 102, the adverse environmental condition areas of the route 102, the adverse vehicular condition areas of the route 10, the regulation limiting areas, and the like. For example, the designated areas 308, 310 (shown in FIGS. 3 and 4) can include or represent one or more route restriction areas that are associated with corresponding lower speed limits 312, 314 (shown in FIGS. 3 and 4). The lower speed limits 312, 314 may be established to prevent the vehicle 100 from traveling too slow such that the vehicle 100 has sufficient speed and/or energy (e.g., kinetic and/or potential energies) to travel through the areas.

The controller 202 may control or direct the control of the vehicle 100 so that the vehicle 100 is traveling fast enough and/or has enough energy when the vehicle 100 enters the route restriction areas that the vehicle 100 will travel through the area at speeds that are at least as fast as the lower speed limit associated with the regulation limiting areas throughout the areas. As one example, the controller 202 may speed up the vehicle 100 above the lower speed limit so that the vehicle 100 can travel at least as fast as the lower speed limit throughout the area, even with the vehicle 100 slowing down when traveling in the area.

Figure 7:
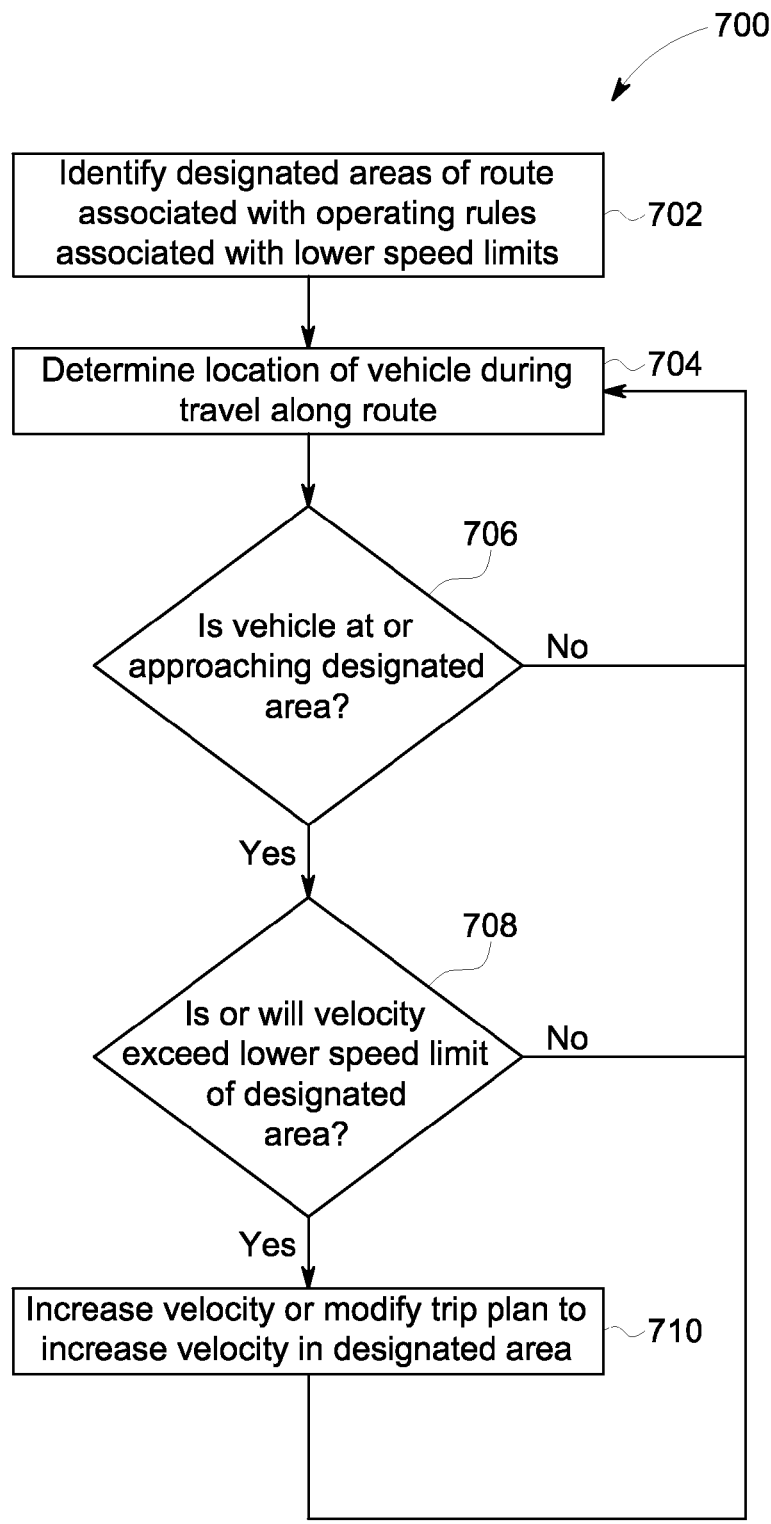
FIG. 7 illustrates one embodiment of a method for controlling movement of a vehicle.

FIG. 7 illustrates one embodiment of a method 700 for controlling movement of a vehicle. The method 700 may be used in conjunction with one or more embodiments of the control system 200 (shown in FIG. 2) described above. For example, the method 700 may be used to control the vehicle 100 (shown in FIG. 1) such that the vehicle 100 travels at least as fast as lower speed limits of one or more operating rules in order to prevent the vehicle 100 from having to stop and recharge air brakes 208 (shown in FIG. 2), from traveling too slow and causing the engine 210 (shown in FIG. 2) to stall, from tilting too much along a banked section 600 (shown in FIG. 5) of a route 102 (shown in FIG. 1), from traveling too slow to effectively clean the route 102, and the like.

At 702, designated areas 308, 310 (shown in FIG. 3) of the route 102 that are associated with operating rules are identified. As described above, these rules may have associated lower speed limits 312, 314 (shown in FIG. 3) that prevent the vehicle 100 from traveling too slowly through the designated areas 308, 310. For example, the lower speed limits 312, 314 may be established so that the vehicle 100 avoids having to stop and recharge air brake pressure, the vehicle 100 does not cause the engine 210 to stall, the vehicle 100 does not tilt too far, and/or the route cleaning apparatus 234 has sufficient power to clean the route 102, as described above.

At 704, a current location of the vehicle 100 is identified as the vehicle 100 travels along the route 102. For example, the controller 202 can track the locations of the vehicle 100 based on location data from the location determination system 214.

At 706, a determination is made as to whether the vehicle 100 is at or is approaching a designated area associated with an operating rule. For example, based on the locations of the vehicle 100 that are monitored, the controller 202 may determine if the vehicle 100 is approaching a downhill section 104 (shown in FIG. 1) of the route 102, an airflow restricted area 500 (shown in FIG. 5) of the route 102, and/or a banked section 600 (shown in FIG. 6) of the route 102. With respect to the route cleaning apparatus 234, the controller 202 may determine if the vehicle 100 is at or is approaching a section of the route 102 that is to be cleaned, and/or determine if the route cleaning apparatus 234 has been activated.

If the vehicle 100 is at or is approaching (e.g., is within a designated distance) the area associated with the operating rule, then the speed of the vehicle 100 may need to be examined in order to determine if the vehicle 100 is traveling sufficiently fast to satisfy the requirements of the operating rule. As a result, flow of the method 700 may proceed to 708. Otherwise, flow of the method 700 may return to 704, where the location of the vehicle 100 continues to be monitored.

At 708, the velocity of the vehicle 100 (e.g., the actual velocity or the velocity designated by a trip plan) is examined to determine if the velocity will meet or exceed the lower speed limit 312, 314 of the operating rule. For example, the controller 202 may monitor speed data from the speed sensor 218 and/or the energy management system 230 (shown in FIG. 2) may examine the trip plan to determine if the vehicle 100 is traveling or will travel at a speed that is slower than the lower speed limit 312, 314 of the operating rule. If the vehicle 100 is traveling or will be traveling too slow when the vehicle 100 is in the designated area associated with the operating rule, then the speed of the vehicle 100 may need to be increased. As a result, flow of the method 700 can proceed to 710. Otherwise, the vehicle 100 may be traveling sufficiently fast to satisfy the operating rule. As a result, flow of the method 700 can return to 704, so that the location and/or speed of the vehicle 100 can continue to be monitored.

At 710, the velocity of the vehicle 100 and/or the trip plan for the vehicle 100 is modified. For example, the vehicle 100 may speed up and/or the trip plan may be modified so that the vehicle 100 is directed to travel at faster speeds in the designated area associated with the operating rule, as described above. Flow of the method 700 can return to 704, so that the location and/or speed of the vehicle 100 can continue to be monitored.

In another embodiment, a control system includes an onboard controller, a location determination system, and a speed data sensor. The controller is configured to identify a designated area along a route being traveled by a vehicle. The designated area includes one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route. The designated area is associated with an operating rule that requires the vehicle to travel at least as fast as a designated lower speed limit. The location determination system is configured to monitor actual locations of the vehicle as the vehicle travels along the route. The speed data sensor is configured to obtain speed data representative of an actual velocity of the vehicle. The controller also is configured to restrict control of the vehicle such that the actual velocity of the vehicle is at least as fast as the lower speed limit of the designated area when the vehicle travels in the designated area.

In one aspect, the designated area includes the downhill section of the route and the operating rule requires an air brake of the vehicle to be activated to stop movement of the vehicle if the vehicle travels slower than the designated lower speed limit. The operating rule may require the stoppage of the vehicle to allow the air brake to recharge air pressure of the air brake.

In one aspect, the designated area includes the airflow restricted area of the route and the operating rule requires the vehicle to travel at least as fast as the designated lower speed limit to prevent stalling of an engine of the vehicle due to restricted airflow in the airflow restricted area.

In one aspect, the designated area includes the banked section of the route and the operating rule requires the vehicle to travel at least as fast as the designated lower speed limit to prevent tilting of the vehicle on the banked section of the route beyond a designated tilting amount.

In one aspect, the designated area includes the section of the route to be cleaned and the operating rule requires the vehicle to travel at least as fast as the designated lower speed limit to power a route cleaning apparatus of the vehicle to clean the route.

In one aspect, the designated area includes the adverse environmental condition area of the route that is associated with at least one of adverse wind conditions, adverse water current conditions, moisture on the route, or ice on the route, and the operating rule requires the vehicle to travel at least as fast as the designated lower speed limit in order to be able to travel through the adverse environmental condition area of the route.

In one aspect, the designated area includes the adverse vehicular condition area of the route that is associated with at least one of an insufficient amount of a friction modifying substance in the vehicle that can be applied to the route or an exhaust of a leading powered unit in the vehicle causing stalling of a trailing powered unit in the vehicle when the vehicle travels slower than the designated speed limit, and the operating rule that requires the vehicle to travel at least as fast as the designated lower speed limit in order to be able to travel through the adverse vehicular condition area of the route.

In one aspect, the designated area includes the section of the route where travel is restricted by the one or more regulatory or legal restrictions that include restrictions on at least one of audible noise or exhaust generated by the vehicle. The operating rule requires the vehicle to travel at least as fast as the designated lower speed limit in order to be able to travel through the designated area without violating the one or more regulator or legal restrictions.

In one aspect, the controller is configured to monitor manually input changes to a throttle of the vehicle and to prevent the manually input changes from being implemented when the manually input changes would cause the vehicle to travel below the lower speed limit when the vehicle is in the designated area.

In one aspect, the system also includes an energy management system configured to at least one of create or modify a trip plan for the vehicle to travel along the route for a trip. The trip plan includes designated operational settings of the vehicle expressed as a function of at least one of distance along the route or time elapsed during the trip. The controller is configured to at least one of automatically control the vehicle according to the designated operational settings or direct an operator how to control the vehicle according to the designated operational settings.

In one aspect, the energy management system is configured to identify the designated area and to establish or modify the designated operational settings to ensure that the vehicle travels faster than the lower speed limit in the designated area prior to the vehicle entering the designated area.

In one aspect, the lower speed limit of the operating rule is a non-zero speed threshold.

In another embodiment, a method (e.g., for controlling a vehicle) includes identifying a designated area along a route being traveled by a vehicle. The designated area includes one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route. The designated area is associated with an operating rule that requires the vehicle to travel at least as fast as a designated lower speed limit. The method also includes monitoring actual locations of the vehicle as the vehicle travels along the route, monitoring actual velocity of the vehicle, and controlling the vehicle such that the actual velocity of the vehicle is at least as fast as the lower speed limit of the designated area when the vehicle travels in the designated area.

In one aspect, the designated area includes the downhill section of the route and the operating rule requires an air brake of the vehicle to be activated to stop movement of the vehicle if the vehicle travels slower than the designated lower speed limit to allow the air brake to recharge air pressure of the air brake.

In one aspect, the designated area includes the airflow restricted area of the route and the operating rule requires the vehicle to travel at least as fast as the designated lower speed limit to prevent stalling of an engine of the vehicle due to restricted airflow in the airflow restricted area.

In one aspect, the designated area includes the banked section of the route and the operating rule requires the vehicle to travel at least as fast as the designated lower speed limit to prevent tilting of the vehicle on the banked section of the route beyond a designated tilting amount.

In one aspect, the designated area includes the section of the route to be cleaned and the operating rule requires the vehicle to travel at least as fast as the designated lower speed limit to power a route cleaning apparatus of the vehicle to clean the route.

In one aspect, the designated area includes the adverse environmental condition area of the route that is associated with at least one of adverse wind conditions, adverse water current conditions, moisture on the route, or ice on the route and the operating rule requires the vehicle to travel at least as fast as the designated lower speed limit in order to be able to travel through the adverse environmental condition area of the route.

In one aspect, the designated area includes the adverse vehicular condition area of the route that is associated with at least one of an insufficient amount of a friction modifying substance in the vehicle that can be applied to the route or an exhaust of a leading powered unit in the vehicle causing stalling of a trailing powered unit in the vehicle when the vehicle travels slower than the designated speed limit and the operating rule requires the vehicle to travel at least as fast as the designated lower speed limit in order to be able to travel through the adverse vehicular condition area of the route.

In one aspect, the designated area includes the section of the route where travel is restricted by the one or more regulatory or legal restrictions that include restrictions on at least one of audible noise or exhaust generated by the vehicle. The operating rule can require the vehicle to travel at least as fast as the designated lower speed limit in order to be able to travel through the designated area without violating the one or more regulator or legal restrictions.

In one aspect, the method also includes monitoring manually input changes to a throttle of the vehicle and preventing the manually input changes from being implemented when the manually input changes would cause the vehicle to travel below the lower speed limit when the vehicle is in the designated area.

In one aspect, the method also includes at least one of creating or modifying a trip plan for the vehicle to travel along the route for a trip. The trip plan includes designated operational settings of the vehicle expressed as a function of at least one of distance along the route or time elapsed during the trip. The method also can include at least one of automatically controlling the vehicle according to the designated operational settings or directing an operator how to control the vehicle according to the designated operational settings.

In one aspect, the method also includes at least one of establishing or modifying the designated operational settings to ensure that the vehicle travels faster than the designated lower speed limit in the designated area prior to the vehicle entering the designated area.

In one aspect, the lower speed limit is a non-zero speed threshold.

In another embodiment, a control system (e.g., for a vehicle) is provided and includes an onboard controller, a location determination system, and a speed data sensor. The controller is configured to identify a designated area along a route being traveled by a vehicle. The designated area is associated with a brake operating rule that requires engagement of a brake of the vehicle for stopping the vehicle if the vehicle travels at a velocity slower than a lower speed limit in the designated area. The location determination system is configured to monitor actual locations of the vehicle as the vehicle travels along the route. The speed data sensor is configured to obtain speed data representative of an actual velocity of the vehicle. The controller also is configured to restrict control of the vehicle such that the actual velocity of the vehicle is at least as fast as the lower speed limit when the vehicle travels in the designated area.

In one aspect, the controller is configured to monitor manually input changes to a throttle of the vehicle and to prevent the manually input changes from being implemented when the manually input changes would cause the vehicle to travel below the lower speed limit when the vehicle is in the designated area.

In one aspect, the brake of the vehicle is an air brake and the brake operating rule requires the vehicle to stop, subsequent to the brake being automatically engaged according to the brake operating rule, for at least a time period that allows air pressure of the air brake to increase to at least a designated pressure before the vehicle can continue traveling along the route.

In one aspect, the control system also includes an energy management system that is configured to at least one of create or modify a trip plan for the vehicle to travel along the route for a trip. The trip plan includes designated operational settings of the vehicle expressed as a function of at least one of distance along the route or time elapsed during the trip. The controller is configured to at least one of automatically control the vehicle according to the designated operational settings or direct an operator how to control the vehicle according to the designated operational settings.

In one aspect, the energy management system is configured to identify the designated area and to establish or modify the designated operational settings to ensure that the vehicle travels faster than the designated lower speed limit in the designated area prior to the vehicle entering the designated area.

In one aspect, the lower speed limit of the brake operating rule is a non-zero speed threshold.

In one aspect, the controller is configured to identify an upcoming designated airflow restricted area ahead of the vehicle along the route that is associated with an engine operating rule. The engine operating rule requires the controller to at least one of autonomously control the vehicle or notify an operator to control the vehicle such that the actual velocity of the vehicle is greater than a designated speed limit when the vehicle enters the airflow restricted area. In one embodiment, the rule may require that the vehicle achieve a velocity that is sufficiently fast prior to entering the airflow restricted area that the vehicle maintains the velocity above the designated speed limit throughout the airflow restricted area.

In one aspect, the airflow restricted area is an area having airflow outside of the vehicle that is restricted such that travel of the vehicle below the designated speed limit results in an engine of the vehicle stalling.

In one aspect, the airflow restricted area is located within a tunnel.

In one aspect, the controller is configured to identify a designated banked area of the route that is associated with a vehicle operating rule. The vehicle operating rule requires the controller to at least one of autonomously control the vehicle or notify an operator to control the vehicle such that the actual velocity of the vehicle is sufficiently fast when the vehicle enters the banking area that the vehicle maintains the actual velocity at least as fast as a designated speed limit when the vehicle is within the banked area of the route.

In one aspect, the banked area is a curved portion of the route that is tilted such that one lateral side of the route is disposed lower than an opposite lateral side of the route such that travel of the vehicle below the designated speed limit results in the vehicle tilting by more than a designated tilt threshold.

In one aspect, the controller is configured to identify a cleaning area of the route that is to be cleaned by a route cleaning apparatus of the vehicle. The controller is configured to at least one of autonomously control the vehicle or notify an operator to control the vehicle such that the actual velocity of the vehicle is maintained above a designated speed limit when the vehicle is within the cleaning area and the route cleaning apparatus is cleaning the route.

In one aspect, the cleaning area is a portion of the route having at least one of debris or moisture on the route that is removed from the route by the route cleaning apparatus.

In one aspect, the route cleaning apparatus operates based on the actual velocity of the vehicle and cleans the route only when the actual velocity is above the speed limit.

In one aspect, the controller is configured to identify an upcoming tractive-effort deficient area disposed ahead of the vehicle along the route that is associated with a tractive effort rule. The tractive effort rule requires the controller to at least one of autonomously control the vehicle or notify an operator to control the vehicle such that the actual velocity of the vehicle is sufficiently fast when the vehicle enters the tractive-effort deficient area that the actual velocity remains at least as fast as a designated speed limit when the vehicle is within the tractive-effort deficient area.

In another embodiment, a method (e.g., for controlling movement of a vehicle) includes identifying a designated area along a route being traveled by the vehicle. The designated area is associated with a brake operating rule that requires engaging a brake of the vehicle to stop the vehicle if the vehicle travels at a velocity slower than a lower speed limit in the designated area. The method also includes obtaining speed data representative of an actual velocity of the vehicle, monitoring actual locations of the vehicle as the vehicle travels along the route, and maintaining the actual velocity of the vehicle to be at least as fast as the lower speed limit when the vehicle travels in the designated area.

In one aspect, maintaining the actual velocity of the vehicle comprises preventing manually input changes to a throttle of the vehicle to be ignored by the controller when the changes would cause the actual velocity to decrease below the lower speed limit when the vehicle is in the designated area.

In one aspect, the brake of the vehicle is an air brake and the brake operating rule requires the vehicle stop for at least a time period that allows air pressure of the air brake to increase to at least a designated pressure before the vehicle can continue traveling along the route.

In one aspect, the method also includes at least one of creating or modifying a trip plan for the vehicle to travel along the route for a trip. The trip plan includes designated operational settings of the vehicle expressed as a function of at least one of distance along the route or time elapsed during the trip. The method also includes at least one of automatically controlling the vehicle according to the designated operational settings or directing an operator how to control the vehicle according to the designated operational settings.

In one aspect, the at least one of creating or modifying the trip plan includes establishing or modifying the designated operational settings to ensure that the vehicle travels faster than the designated lower speed limit in the designated area prior to the vehicle entering the designated area.

In one aspect, the lower speed limit of the brake operating rule is a non-zero speed threshold.

In one aspect, identifying the designated area includes identifying a designated airflow restricted area along the route that is associated with an engine operating rule. The engine operating rule requires an onboard controller of the vehicle to at least one of autonomously control the vehicle or notify an operator to control the vehicle such that the actual velocity of the vehicle is maintained above a designated speed limit when the vehicle is within the airflow restricted area.

In one aspect, the airflow restricted area is an area having airflow outside of the vehicle that is restricted such that travel of the vehicle below the designated speed limit results in an engine of the vehicle stalling.

In one aspect, the airflow restricted area is located within a tunnel.

In one aspect, identifying the designated area includes identifying a designated banked area of the route that is associated with a vehicle operating rule. The vehicle operating rule requires an onboard controller of the vehicle to at least one of autonomously control the vehicle or notify an operator to control the vehicle such that the actual velocity of the vehicle is maintained above a designated speed limit when the vehicle is within the banked area of the route.

In one aspect, the banked area is a curved portion of the route that is tilted such that one lateral side of the route is disposed lower than an opposite lateral side of the route such that travel of the vehicle below the designated speed limit results in the vehicle tilting by more than a designated tilt threshold.

In one aspect, identifying the designated area includes identifying a cleaning area of the route that is to be cleaned by a route cleaning apparatus of the vehicle. The method can also include at least one of autonomously controlling the vehicle or notifying an operator to control the vehicle such that the actual velocity of the vehicle is maintained above a designated speed limit when the vehicle is within the cleaning area and the route cleaning apparatus is cleaning the route.

In one aspect, the cleaning area is a portion of the route having at least one of debris or moisture on the route that is removed from the route by the route cleaning apparatus.

In one aspect, the route cleaning apparatus operates based on the actual velocity of the vehicle and cleans the route only when the actual velocity is above the speed limit.

In another embodiment, another control system (e.g., for a vehicle) is provided and includes a location determination system, a speed data sensor, and an onboard controller. The location determination system is configured to monitor actual locations of a vehicle as the vehicle travels along a route. The speed data sensor is configured to obtain speed data representative of an actual velocity of the vehicle. The controller is configured to identify one or more designated areas along a route being traveled by a vehicle. The designated areas are associated with one or more operating rules that require the vehicle to travel at least as fast as a lower speed limit when the vehicle is in the one or more designated areas. The controller also is configured to restrict control of the vehicle such that the actual velocity of the vehicle is at least as fast as the lower speed limit when the vehicle travels in the designated area. The one or more operating rules include at least one of: a brake operating rule that requires a brake of the vehicle to be automatically engaged when the vehicle travels slower than the lower speed limit, an engine operating rule the engine that requires the controller to at least one of autonomously control the vehicle or notify an operator to control the vehicle such that the actual velocity of the vehicle is maintained above the lower speed limit when the vehicle is within an airflow restricted area, a vehicle operating rule that requires the controller to at least one of autonomously control the vehicle or notify an operator to control the vehicle such that the actual velocity of the vehicle is maintained above the lower speed limit when the vehicle is within a banked area of the route that is banked at an incline greater than a designated incline threshold, a route cleaning rule that requires the controller to at least one of autonomously control the vehicle or notify an operator to control the vehicle such that the actual velocity of the vehicle is maintained above the lower speed limit when the vehicle is within an area of the route that is to be cleaned by a route cleaning apparatus of the vehicle, or a tractive effort operating rule that requires the controller to at least one of autonomously control the vehicle or notify an operator to control the vehicle such that the actual velocity of the vehicle is maintained above the lower speed limit when the vehicle is within an area of the route that is associated with at least one of a decreased friction coefficient of the route, cavitation in the route, or a depletion of a friction-modifying substance onboard the vehicle.

In one aspect, the controller is configured to monitor manually input changes to a throttle of the vehicle and to prevent the manually input changes from being implemented when the manually input changes would cause the vehicle to travel below the lower speed limit when the vehicle is in the one or more designated areas.

In one aspect, the brake of the vehicle is an air brake and the brake operating rule requires the vehicle stop for at least a time period that allows air pressure of the air brake to increase to at least a designated pressure before the vehicle can continue traveling along the route.

In one aspect, the airflow restricted area is an area having airflow outside of the vehicle that is restricted such that travel of the vehicle below the lower speed limit results in an engine of the vehicle stalling.

In one aspect, the banked area is a curved portion of the route that is tilted such that one lateral side of the route is disposed lower than an opposite lateral side of the route such that travel of the vehicle below the lower speed limit results in the vehicle tilting by more than a designated tilt threshold.

In one aspect, the route cleaning apparatus operates based on the actual velocity of the vehicle and cleans the route only when the actual velocity is above the lower speed limit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A control system comprising:
an onboard controller configured to identify a designated area along a route being traveled by a vehicle, the designated area including one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route, the designated area being associated with an operating rule that requires the vehicle to travel at least as fast as a designated lower speed limit;
a location determination system configured to monitor actual locations of the vehicle as the vehicle travels along the route; and
a speed data sensor configured to obtain speed data representative of an actual velocity of the vehicle, wherein the controller also is configured to restrict control of the vehicle such that the actual velocity of the vehicle is at least as fast as the lower speed limit of the designated area when the vehicle travels in the designated area.

2. The control system of claim 1, wherein the designated area includes the downhill section of the route and the operating rule requires an air brake of the vehicle to be activated to stop movement of the vehicle if the vehicle travels slower than the designated lower speed limit.

3. The control system of claim 1, wherein the designated area includes the airflow restricted area of the route and the operating rule requires the vehicle to travel at least as fast as the designated lower speed limit to prevent stalling of an engine of the vehicle due to restricted airflow in the airflow restricted area.

4. The control system of claim 1, wherein the designated area includes the banked section of the route and the operating rule requires the vehicle to travel at least as fast as the designated lower speed limit to prevent tilting of the vehicle on the banked section of the route beyond a designated tilting amount.

5. The control system of claim 1, wherein the designated area includes the section of the route to be cleaned and the operating rule requires the vehicle to travel at least as fast as the designated lower speed limit to power a route cleaning apparatus of the vehicle to clean the route.

6. The control system of claim 1, wherein the designated area includes the adverse environmental condition area of the route that is associated with at least one of adverse wind conditions, adverse water current conditions, moisture on the route, or ice on the route, and the operating rule requires the vehicle to travel at least as fast as the designated lower speed limit in order to be able to travel through the adverse environmental condition area of the route.

7. The control system of claim 1, wherein the designated area includes the adverse vehicular condition area of the route that is associated with at least one of an insufficient amount of a friction modifying substance in the vehicle that can be applied to the route or an exhaust of a leading powered unit in the vehicle causing stalling of a trailing powered unit in the vehicle when the vehicle travels slower than the designated speed limit, and the operating rule requires the vehicle to travel at least as fast as the designated lower speed limit in order to be able to travel through the adverse vehicular condition area of the route.

8. The control system of claim 1, wherein the designated area includes the section of the route where travel is restricted by the one or more regulatory or legal restrictions that include restrictions on at least one of audible noise or exhaust generated by the vehicle, and the operating rule requires the vehicle to travel at least as fast as the designated lower speed limit in order to be able to travel through the designated area without violating the one or more regulator or legal restrictions.

9. The control system of claim 1, wherein the controller is configured to monitor manually input changes to a throttle of the vehicle and to prevent the manually input changes from being implemented when the manually input changes would cause the vehicle to travel below the lower speed limit when the vehicle is in the designated area.

10. The control system of claim 1, further comprising an energy management system configured to at least one of create or modify a trip plan for the vehicle to travel along the route for a trip, the trip plan including designated operational settings of the vehicle expressed as a function of at least one of distance along the route or time elapsed during the trip, wherein the controller is configured to at least one of automatically control the vehicle according to the designated operational settings or direct an operator how to control the vehicle according to the designated operational settings.

11. The control system of claim 10, wherein the energy management system is configured to identify the designated area and to establish or modify the designated operational settings to ensure that the vehicle travels faster than the lower speed limit in the designated area prior to the vehicle entering the designated area.

12. The control system of claim 1, wherein the lower speed limit of the operating rule is a non-zero speed threshold.

13. A method comprising:
identifying a designated area along a route being traveled by a vehicle, the designated area including one or more of a downhill section of the route, an airflow restricted area of the route, a banked section of the route, a section of the route to be cleaned, an adverse environmental condition area of the route, an adverse vehicular condition area of the route, a section of the route where travel is restricted by one or more regulatory or legal restrictions, or a section of the route where travel is restricted due to a condition of the route, the designated area being associated with an operating rule that requires the vehicle to travel at least as fast as a designated lower speed limit;
monitoring actual locations of the vehicle as the vehicle travels along the route;
monitoring actual velocity of the vehicle; and
controlling the vehicle such that the actual velocity of the vehicle is at least as fast as the lower speed limit of the designated area when the vehicle travels in the designated area.

14. The method of claim 13, wherein the designated area includes the downhill section of the route and the operating rule requires an air brake of the vehicle to be activated to stop movement of the vehicle if the vehicle travels slower than the designated lower speed limit.

15. The method of claim 13, wherein the designated area includes the airflow restricted area of the route and the operating rule requires the vehicle to travel at least as fast as the designated lower speed limit to prevent stalling of an engine of the vehicle due to restricted airflow in the airflow restricted area.

16. The method of claim 13, wherein the designated area includes the banked section of the route and the operating rule requires the vehicle to travel at least as fast as the designated lower speed limit to prevent tilting of the vehicle on the banked section of the route beyond a designated tilting amount.

17. The method of claim 13, wherein the designated area includes the section of the route to be cleaned and the operating rule requires the vehicle to travel at least as fast as the designated lower speed limit to power a route cleaning apparatus of the vehicle to clean the route.

18. The method of claim 13, wherein the designated area includes the adverse environmental condition area of the route that is associated with at least one of adverse wind conditions, adverse water current conditions, moisture on the route, or ice on the route, and the operating rule requires the vehicle to travel at least as fast as the designated lower speed limit in order to be able to travel through the adverse environmental condition area of the route.

19. The method of claim 13, wherein the designated area includes the adverse vehicular condition area of the route that is associated with at least one of an insufficient amount of a friction modifying substance in the vehicle that can be applied to the route or an exhaust of a leading powered unit in the vehicle causing stalling of a trailing powered unit in the vehicle when the vehicle travels slower than the designated speed limitand the operating rule requires the vehicle to travel at least as fast as the designated lower speed limit in order to be able to travel through the adverse vehicular condition area of the route.

20. The method of claim 13, wherein the designated area includes the section of the route where travel is restricted by the one or more regulatory or legal restrictions that include restrictions on at least one of audible noise or exhaust generated by the vehicle, and the operating rule requires the vehicle to travel at least as fast as the designated lower speed limit in order to be able to travel through the designated area without violating the one or more regulator or legal restrictions.

21. The method of claim 13, further comprising monitoring manually input changes to a throttle of the vehicle and preventing the manually input changes from being implemented when the manually input changes would cause the vehicle to travel below the lower speed limit when the vehicle is in the designated area.

22. The method of claim 13, further comprising:
at least one of creating or modifying a trip plan for the vehicle to travel along the route for a trip, the trip plan including designated operational settings of the vehicle expressed as a function of at least one of distance along the route or time elapsed during the trip; and
at least one of automatically controlling the vehicle according to the designated operational settings or directing an operator how to control the vehicle according to the designated operational settings.

23. The method of claim 22, further comprising at least one of establishing or modifying the designated operational settings to ensure that the vehicle travels faster than the designated lower speed limit in the designated area prior to the vehicle entering the designated area.

24. The method of claim 13, wherein the lower speed limit is a non-zero speed threshold.

25. A control system comprising:
an onboard controller configured to identify a designated area along a route being traveled by a vehicle, the designated area associated with a brake operating rule in a memory, the brake operating rule requiring the controller to automatically engage a brake of the vehicle for stopping the vehicle if the vehicle travels at a velocity slower than a lower speed limit in the designated area;
a location determination system configured to monitor actual locations of the vehicle as the vehicle travels along the route; and
a speed data sensor configured to obtain speed data representative of an actual velocity of the vehicle, wherein the controller also is configured to restrict control of the vehicle such that the actual velocity of the vehicle is at least as fast as the lower speed limit when the vehicle travels in the designated area.

26. The control system of claim 25, wherein the controller is configured to monitor manually input changes to a throttle of the vehicle and to prevent the manually input changes from being implemented when the manually input changes would cause the vehicle to travel below the lower speed limit when the vehicle is in the designated area.

27. The control system of claim 25, wherein the brake of the vehicle is an air brake and the brake operating rule requires the vehicle to stop, subsequent to the brake being automatically engaged according to the brake operating rule, for at least a time period that allows air pressure of the air brake to increase to at least a designated pressure before the vehicle can continue traveling along the route.

28. The control system of claim 25, further comprising an energy management system configured to at least one of create or modify a trip plan for the vehicle to travel along the route for a trip, the trip plan including designated operational settings of the vehicle expressed as a function of at least one of distance along the route or time elapsed during the trip, wherein the controller is configured to at least one of automatically control the vehicle according to the designated operational settings or direct an operator how to control the vehicle according to the designated operational settings.

29. The control system of claim 28, wherein the energy management system is configured to identify the designated area and to establish or modify the designated operational settings to ensure that the vehicle travels faster than the designated lower speed limit in the designated area prior to the vehicle entering the designated area.

30. The control system of claim 25, wherein the lower speed limit of the brake operating rule is a non-zero speed threshold.

* * * * *